United States Patent [19]
Gore

[11] Patent Number: 5,749,408
[45] Date of Patent: May 12, 1998

[54] METHOD FOR FREEFORM FABRICATION BY MOLTEN METAL DEPOSITION

[75] Inventor: David W. Gore, Corvallis, Oreg.

[73] Assignee: Incre, L.L.C., Corvallis, Oreg.

[21] Appl. No.: 692,908

[22] Filed: Jul. 31, 1996

[51] Int. Cl.⁶ .................................................. B22D 46/00
[52] U.S. Cl. ........................... 164/4.1; 164/47; 164/94
[58] Field of Search ........................... 164/452, 457, 164/46, 155.2, 155.3, 155.4, 155.5, 4.1, 47, 94

[56] References Cited

U.S. PATENT DOCUMENTS

| | | | |
|---|---|---|---|
| 5,598,200 | 1/1997 | Gore | 347/88 |
| 5,617,911 | 4/1997 | Sterett et al. | 164/457 |

*Primary Examiner*—Joseph J. Hail, III
*Assistant Examiner*—I.-H. Lin
*Attorney, Agent, or Firm*—Chernoff, Vilhauer, McClung & Stenzel

[57] ABSTRACT

The height of a layer of material formed by molten metal disposition is measured by ejecting the material as elongate extrusions and measuring the time required for each extrusion to contact the workpiece, then using this time interval along with the speed at which the extrusion is ejected to measure the gap between the ejection head and the workpiece. This gap is then used for calculating the height of the previous layer. By making the workpiece and the ejected material electrically conductive, this time interval can be measured by noting when electric current flows through the extrusion.

7 Claims, 4 Drawing Sheets

METHOD FOR FREEFORM FABRICATION BY MOLTEN METAL DEPOSITION

The subject invention relates to a method for producing free-form solid phase metal objects by deposition of thin high temperature liquid metal extrusions by building successive layers of material in a predetermined matter, and in particular to a method for determining the height of the layers that are formed.

BACKGROUND AND SUMMARY OF THE INVENTION

U.S. Pat. No. 5,257,657 describes a method, referred to herein as "droplet deposition", for producing a free-form solid phase object from liquid droplets. An apparatus for creating such droplets, referred to herein as "droplet ejector" is disclosed in my copending patent application Ser. No. 08/378,713 filed Jan. 26, 1995 and now issued as U.S. Pat. No. 5,598,200. The present invention results from efforts to put into practice these earlier inventions.

When a metallic object is built by droplet deposition, it is important to measure the height of the object as each layer of metal is added. Knowing the height allows the droplet deposition path of the next layer to be calculated, and also ensures that the distance between the workpiece and the droplet ejector, referred to herein as the "gap," is kept constant. The height of the workpiece is difficult to predict a priori, since it is sensitive to the, temperature of the workpiece at each point and consequently to the workpiece geometry.

It is surprisingly difficult to measure the height of the fresh metal surface of a workpiece. Optical methods fail due to specular reflections and the high temperature of the build environment. Capacitive proximity sensing is not accurate enough. It is difficult to place enough charge on the droplets to allow measurement of impact times (from which the gap can be estimated). High voltage can be used to create sparks across the gap, and the necessary voltage used to determine the size of the gap, but the voltage necessary creates damaging electromagnetic noise which is difficult to confine to the build environment.

The height sensing problem of the prior art has been overcome in the present invention by altering ejection parameters and bringing the ejection head closer to the workpiece so that an elongate extrusion of molten metal is ejected rather than a drop. The interval between the electronic initiation of the pulse which forms the extrusion and the time at which the extrusion contacts the workpiece, known as the "make time," along with the speed at which the extrusion is ejected, are used to calculate the gap between the injection head and the workpiece. This gap is stored in a micro-processor based controller along with the x-y-z coordinates for each extrusion which is ejected and this information can be used to calculate the height of the strands of material built from the extrusions, and to establish the same gap when a subsequent extrusion is ejected onto the material deposited by that extrusion.

In a preferred embodiment of the invention, the platform on which the workpiece is built and the molten metal are electrically conductive, and the make time is determined by creating an electrical potential between them such that contact of the extrusion with the workpiece completes a circuit. A preferred way to make the material electrically conductive is to place a graphite electrode in the reservoir of molten metal that is used for creating extrusions.

The foregoing and other objectives, features, and advantages of the invention will be more readily understood upon consideration of the following detailed description of the invention, taken in conjunction with the accompanying drawings.

DETAILED DESCRIPTION OF THE DRAWINGS

DETAILED DESCRIPTION OF A PREFERRED EMBODIMENT

Figure 1:
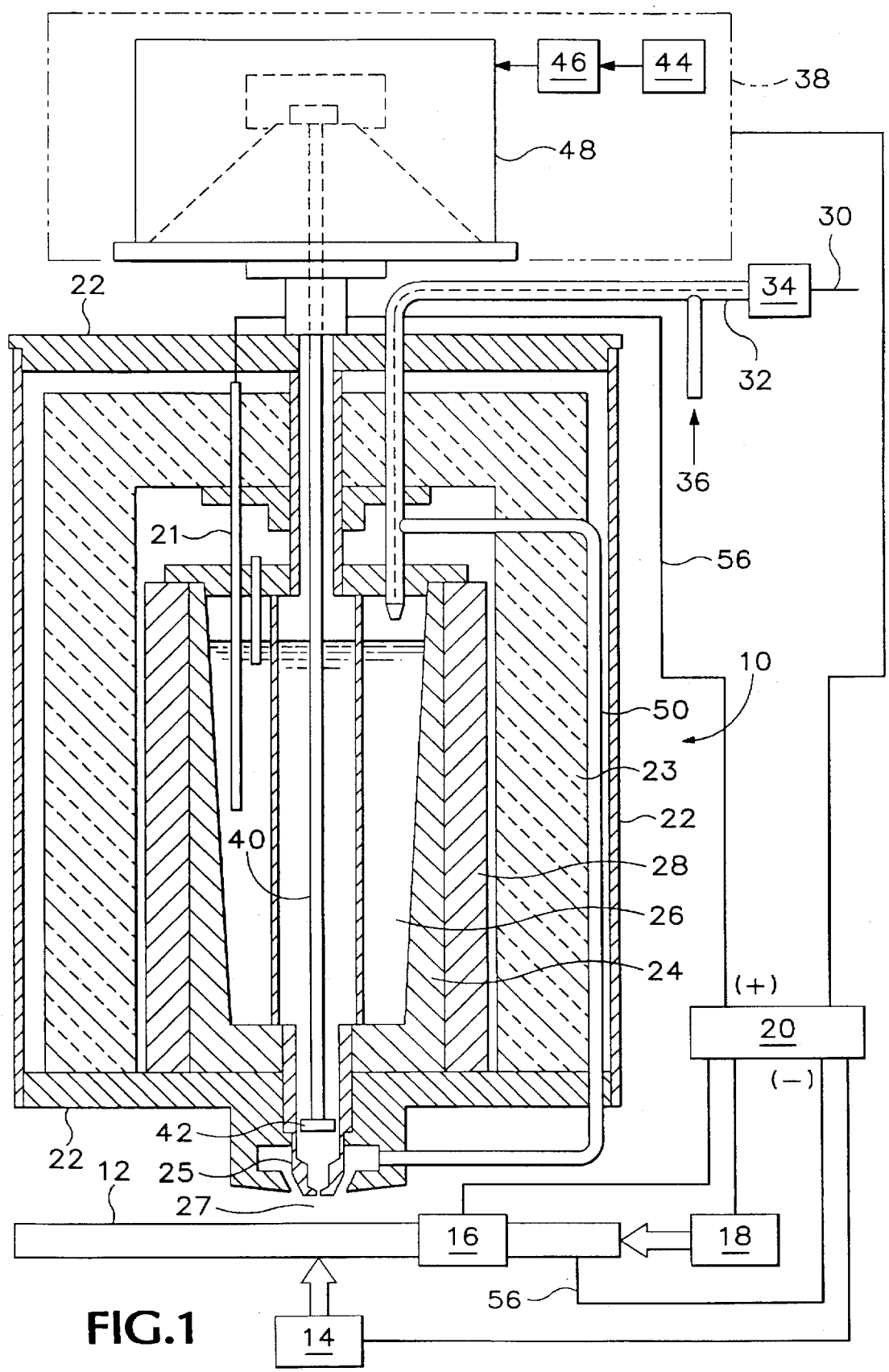
FIG. 1 is a schematic view of a molten metal ejection apparatus used to practice the subject invention with the ejection head shown in cross-section.
Figure 2:
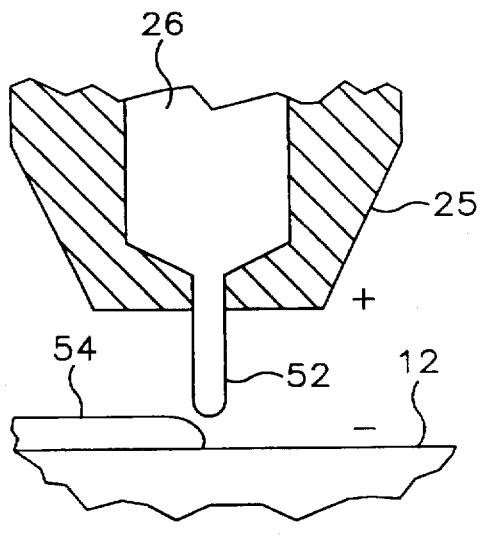
FIGS. 2–5 are schematic views that show the sequence of building a first layer of material on a platform.
Figure 3:
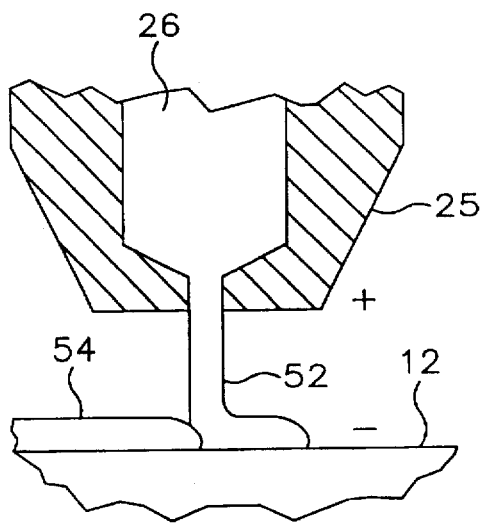
Figure 4:
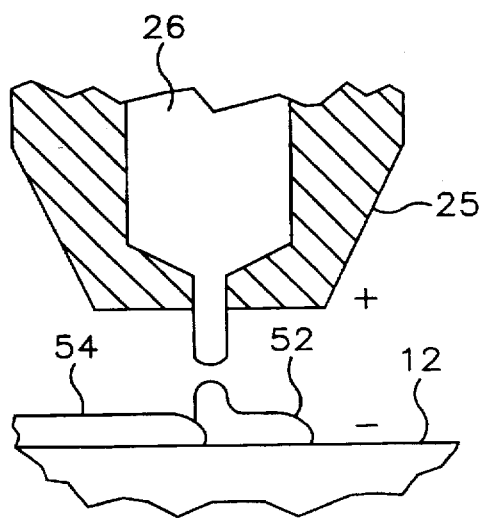
Figure 5:
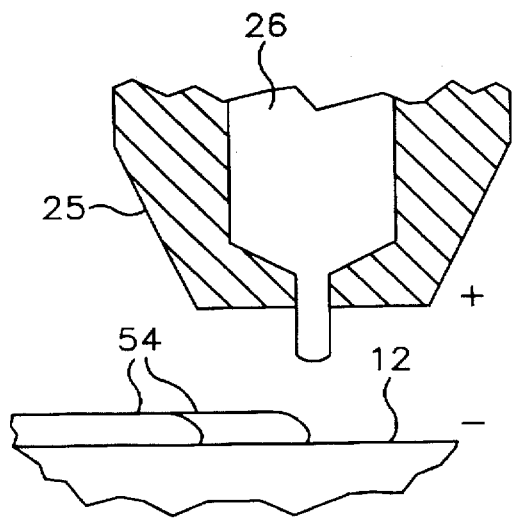
Figure 6:
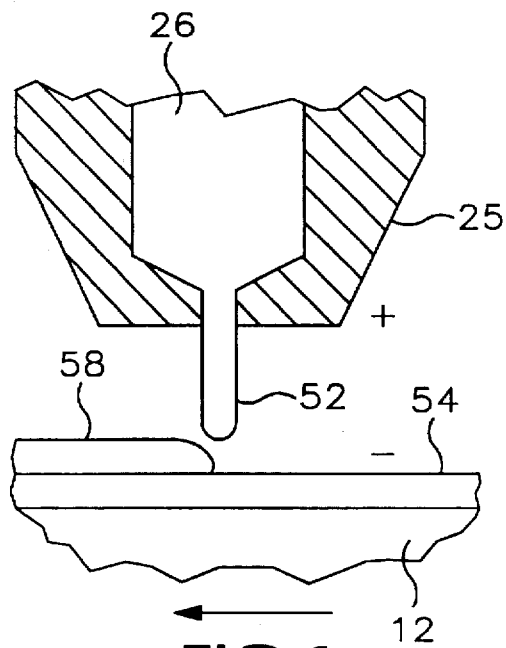
FIGS. 6–9 are schematic views showing the method of building a second layer on top of the initial layer.
Figure 7:
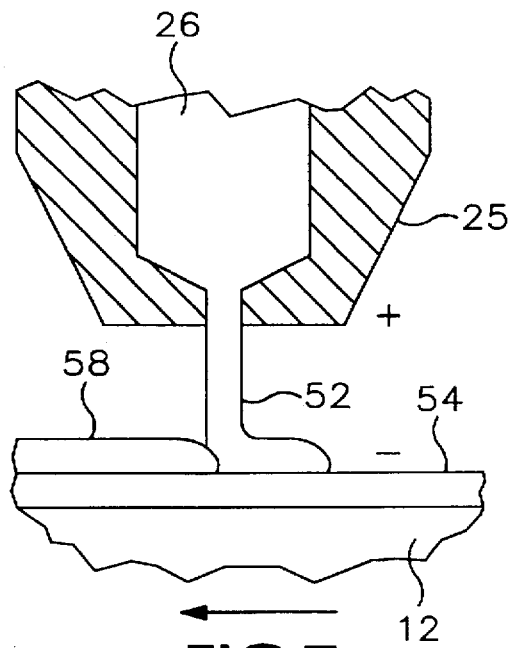
Figure 8:
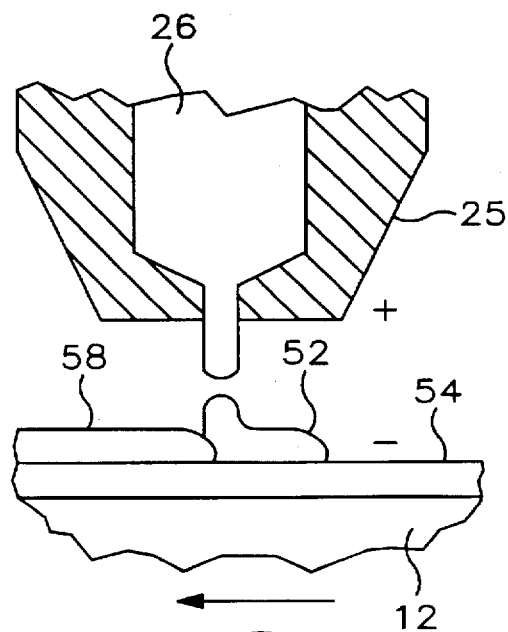
Figure 9:
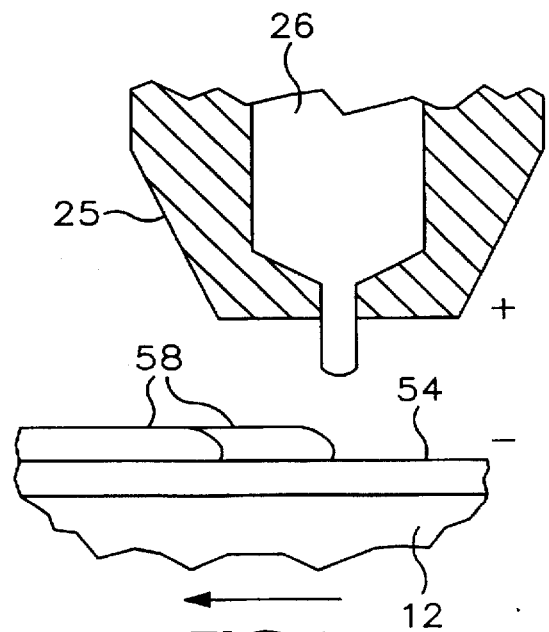

Referring now to FIG. 1 of the drawings, the method of the subject invention utilizes an ejection head 10 which ejects a series of molten extrusions of material onto a platform 12. The ejection head is similar to that disclosed in my copending application Ser. No. 08/378,713, which is incorporated herein by reference, with a few important exceptions which will be explained later. In the embodiment illustrated the platform is movable both horizontally and vertically relative to the ejection head. A first positioner 14 moves the platform vertically, a second positioner 16 moves the platform horizontally in the x direction and a third positioner 18 moves the platform horizontally in the y direction. In addition to moving the platform the positioners measure the location of the platform relative to the ejection head and a microprocessor based controller 20 is programmed to keep track of the position of the platform and to move it to the desired position, as will be more fully explained later. While the drawings show the platform as being moveable relative to the ejection head, the head could be movable relative to the platform as well.

The ejection head 10 comprises a shell 22 having a hollow, tapered wall vessel 24 located in it which carries the liquid material 26 that will be ejected from the ejection head, in this case molten metal or another electrically conductive material. The vessel 24 is surrounded by a heater 28 that melts the material and keeps it liquid. An insulation material 23 is located between the heater and the shell. A nozzle 25 having an orifice 27 is located at the bottom of the vessel 24. Solid material is fed into the vessel through a feed supply line 32 by a motor 34. Pressurized inert gas 36 is also fed into the vessel through the feed supply line 32. An impulse generator 38 oscillates an impulse rod 40 having a plunger 42 at its lower extremity to eject elongate extrusions of molten metal out of the orifice of a desired size and at a desired frequency. The impulse generator comprises a pulse generator 44 whose signal is amplified by an amplifier 46 and fed to a loudspeaker 48 to move the impulse rod at the desired frequency. The pulse generator is controlled by the controller 20. Cool inert gas 36 is fed outside of the vessel through a line 50 and exhausted normal to the orifice. As explained in copending application Ser. No. 08/378,713 and now issued as U.S. Pat. No. 5,598,200, the amplitude and frequency of the impulse generator and the pressure of the inert gas on top of the vessel controls the size and shape of the extrusions that are ejected from the injector head.

The primary differences between the ejection head used for the subject invention and the ejection head in my copending application is that the orifice through which the molten metal is ejected is located at or slightly below the bottom of the remaining parts so that it can be brought closer to the workpiece. This necessitates that the inert gas is fed to the head in a slightly different manner. In addition, the impulse generator is operated in a manner to create elongate extrusions that will extend from the ejection head to the workpiece before separating from the ejection head, rather than drops that separate from the ejection head and fall to the workpiece.

Referring now to FIGS. 2–5, as indicated above, the controller is programmed to eject elongate extrusions 52 from the ejection head 10. A first layer of material comprising one or more strands 54 of material is formed on the platform 12 by ejecting a series of these extrusions with each extrusion being in contact with at least one other extrusion, while moving the platform in the x-y plane such that the first strand 54 has the desired shape. The platform preferably is moved continuously during the extrusion process.

Both the material 26 and platform 12 are conductive and are connected to the controller 20 by means of leads 56. Typically, this is accomplished by using an electrically conductive material and a metal platform and by placing a graphite electrode 21 in the vessel 24. A voltage differential is established between the electrode 21 and platform 12 so that current flows through the leads 56 when an extrusion first contacts the platform and then ceases when it breaks free from the ejection head. The time of current flow is used to calculate the "make time," which is the time interval from when the pulse generator electrically initiates a pulse until the resulting extrusion contacts the platform 12 or previous strand 54. The make time is recorded by the controller for each extrusion. The make time along with the speed at which the extrusion is ejected permits calculating the distance between the ejection head and the platform (or existing layers in the case of subsequent layers), hereinafter referred to as the gap.

Ejection speed can be determined empirically based on the ejection parameters. For each combination of pressure of the inert gas 36 in the vessel 24 and the amplitude and frequency of the impulse generator 38, there will be a particular ejection speed. Prior to the use of the devise, it can be calibrated to determine ejection speed as a function of these ejection parameters by measuring ejection speed at various combinations of these parameters. Methods for measuring ejection speed are well known in the prior art. Two examples of such methods are described below:

1) A strobe light with an external delay circuit can be used to determine the time at which the ejected extrusion first exits the ejection head and the time when it has traveled a predetermined distance. The difference between these times and the distance can then be used to calculate the average speed of the extrusion.

2) The devise itself can also be used to calculate ejection speed by measuring the make time for several known distances between the ejection head and the workpiece.

The gap is calculated by the controller for each extrusion and is recorded along with the x-y-z position of the platform when that extrusion is ejected. Thus, the controller records the x-y position of each extrusion in the first layer and the gap at which each extrusion was ejected. This allows calculation of the height of the portion of the strand resulting from each extrusion in any layer except the last layer. The height of a strand is calculated by subtracting the amount of the gap associated with the extrusion that formed that portion of the strand from the sum of the gap associated with the underlying strand and the amount the platform was lowered prior to forming the layer being measured.

Referring now to FIGS. 6–9 the workpiece is built vertically by placing subsequent strands 58 on top of the previous strand 54. The platform is lowered to increase the z dimension by an amount that is approximately equal to the strand height that was calculated for the underlying strand.

This method depends on keeping the gap within a range such that unbroken extrusions of material are momentarily formed which extend between the nozzle and the platform (or earlier strands). If the gap is too large droplets will be formed and make times cannot be established. If the gap is too small, the extrusions will not break off. This leads to uncontrolled drooling of the extrusions on the workpiece and also prevents measurement of the gap. In addition, if the gap is too small the nozzle can strike a high spot on the underlying strand.

Figure 10:
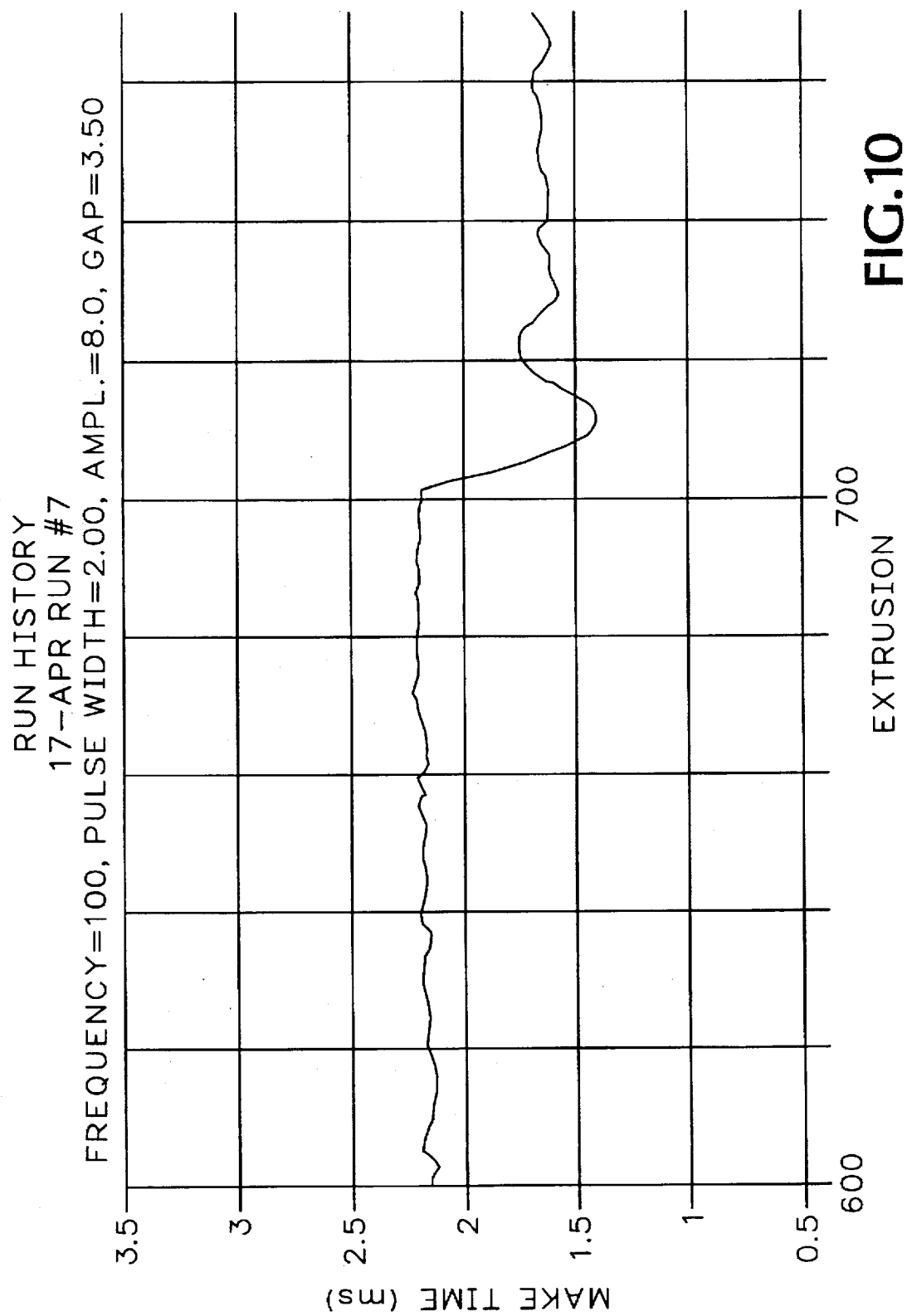
FIG. 10 is a plot showing "make time" versus extrusion count for a specific workpiece built by the subject invention.

In one example of the method of the subject invention, an ejection head with a 0.5 mm diameter orifice and a 5.82 mm diameter vibrator head (in a 6.35 mm diameter chamber) was used to eject molten (880° C.) aluminum extrusions at the rate of 100 per second. The electrical pulse driving vibration was 2.0 milliseconds wide and had a magnitude of 8 volts. The gap was set at 3.5 mm and ejection was on a metal turntable moving at about 25 mm/second relative to the orifice. As can be seen from the plot in FIG. 10, after a full turn of the turntable the strand begins to build on itself and the make time shortens by 0.56 milliseconds. Since the extrusion ejection speed was known to be 2.7 mm/milliseconds, it can be concluded that the strand was 0.56 milliseconds×2.7 mm/millisecond=1.5 mm high. To keep the gap the same during construction of the third layer, the separation between the ejection head and platform need to be increased by 1.5 mm.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for measuring the height of a layer of material that is formed by molten deposition of electrically conductive material comprising:

(a) forming a first layer of material by ejecting a series of continuous elongated extrusions of molten material at a known ejection speed from an ejection head that is separated from a surface onto which said material is deposited by a first predetermined distance;

(b) measuring a first make time for each said extrusion equal to the time between when the ejection of said extrusion is initiated and when said extrusion first contacts said surface;

(c) using said first make time and the election speed to calculate a first gap between the ejection head and said surface for each extrusion;

(d) increasing the separation between the ejection head and said surface by a second predetermined distance;

(e) forming a second layer of material on top of said first layer of material;

(f) measuring a second make time for each extrusion in said second layer of material;

(g) using said second make time to calculate a second gap for each extrusion in said second layer; and (h) calculating the height of the portion of said first layer formed from each extrusion by subtracting the respective second gap from the sum of the associated first gap and said second predetermined distance.

2. The method of claim 1 wherein said material and the platform upon which said layers are supported are electrically conductive and said make time is determined by creating a voltage differential between said platform and said material and measuring the time current flows therebetween.

3. The method of claim 2 wherein said material is metal.

4. The method of claim 1 wherein said second predetermined distance is zero.

5. A method for producing a free-form object by molten deposition of electrically conductive material comprising:

(a) providing a platform having an upper surface;

(b) ejecting an elongate extrusion of molten material at a known ejection speed from an ejection head onto said platform for a predetermined time;

(c) measuring a make time between when the ejection of said extrusion is initiated and when the extrusion first contacts the platform;

(d) using said make time and the election speed to calculate a gap between the ejection head and the platform;

(e) forming a first layer of material on said platform in a desired shape by placing subsequent extrusions in end-to-end contact with one another;

(f) forming a second layer of material on top of first layer by increasing the distance between the ejection head and the platform by an incremental amount for each extrusion in said second layer, said incremental amount being such that the gap for the second layer remains the same as the gap for the first layer; and (g) forming subsequent layers of material on top of said second layer by increasing the distance between the head and the platform by an incremental amount for each layer, said incremental amount for each layer being such that the gap remains approximately the same as it was for the second layer.

6. The method of claim 5 wherein said platform and said material are all electrically conductive and said make time is determined by creating a voltage differential between said platform and said material and measuring the time current flows therebetween.

7. The method of claim 6 wherein said material is metal.

* * * * *

UNITED STATES PATENT AND TRADEMARK OFFICE
CERTIFICATE OF CORRECTION

PATENT NO.   : 5,749,408
DATED        : May 12, 1998
INVENTOR(S)  : David W. Gore It is certified that error appears in the above-indentified patent and that said Letters Patent is hereby corrected as shown below:

Col. 1, line 28      Delete [,] before "temperature".

Col. 5, line 20      Delete [election], insert -- ejection--.

Signed and Sealed this

Twenty-second Day of June, 1999

Attest:

Attesting Officer

Q. TODD DICKINSON

Acting Commissioner of Patents and Trademarks